United States Patent [19]

Ide et al.

[11] Patent Number: 5,281,268
[45] Date of Patent: Jan. 25, 1994

[54] PROCESS FOR THE PRODUCTION OF β-FORM COPPER PHTHALOCYANINE PIGMENT

[75] Inventors: Yusaku Ide; Toshimitsu Ikegaya; Michichika Hikosaka, all of Tokyo, Japan

[73] Assignee: Toyo Ink Manufacturing Co., Ltd., Tokyo, Japan

[21] Appl. No.: 51,271

[22] Filed: Apr. 23, 1993

Related U.S. Application Data

[63] Continuation of Ser. No. 811,239, Dec. 20, 1991, abandoned, which is a continuation-in-part of Ser. No. 574,287, Aug. 28, 1990, abandoned.

[30] Foreign Application Priority Data

Aug. 28, 1989 [JP] Japan ................... 1-220962

[51] Int. Cl.$^5$ ............................... C09B 47/04
[52] U.S. Cl. ........................... 106/410; 106/411; 106/412; 106/413; 540/14; 540/122; 540/136; 540/137; 540/140; 540/141
[58] Field of Search ............... 540/14, 136, 137, 140, 540/141, 122; 106/410, 412, 413

[56] References Cited

U.S. PATENT DOCUMENTS

| | | | |
|---|---|---|---|
| 2,486,351 | 10/1949 | Wiswall | 540/141 |
| 2,556,728 | 6/1951 | Graham | 540/141 |
| 2,556,730 | 6/1951 | Graham | 540/141 |
| 2,857,400 | 10/1958 | Cooper | 544/75 |
| 4,104,276 | 8/1978 | Kranz et al. | 540/134 |
| 5,175,282 | 12/1992 | Roth et al. | 540/141 |

OTHER PUBLICATIONS

Smrcek et al. Chem Abstract, vol. 108 No. 77225h, Abstract of DD 243,182 Feb. 25, 1987.

*Primary Examiner*—Karl Group
*Assistant Examiner*—Scott L. Hertzog
*Attorney, Agent, or Firm*—Wenderoth, Lind & Ponack

[57] ABSTRACT

A process for the production of a β-form copper phthalocyanine having a particle size of 0.005 to 0.2 μm and an aspect ratio of 1 to 3, which comprises the following steps:

a. dry-milling a crude copper phthalocyanine in a milling apparatus until the resultant dry-milled product has an α-crystal content of more than 45% by weight, wet-milling the resultant dry-milled product in the presence of a water-soluble inorganic salt and at least one organic liquid selected from the group consisting of water-soluble alkylene glycols having 2 to 3 carbon atoms and polyoxyalkylene glycols, wherein the inorganic salt is used in an amount that is 2 to 10 times, by weight, as large as that of the dry-milled copper phthalocyanine, and wherein the organic liquid is used in an amount that is 0.1 to 2 times, by weight, as large as that of the dry-milled copper phthalocyanine, and c. removing the inorganic salt and the organic liquid from the resultant wet-milled product.

5 Claims, No Drawings

5,281,268

PROCESS FOR THE PRODUCTION OF β-FORM COPPER PHTHALOCYANINE PIGMENT

This application is a continuation of now abandoned application, Ser. No. 07/811,239 filed on Dec. 20, 1991, which is a continuation-in-part of now abandoned application, Ser. No. 07/574,287 filed Aug. 28, 1990.

FIELD OF THE INVENTION

This invention relates to a novel process for the production of a β-form copper phthalocyanine pigment, more specifically to a process for the production of a β-form copper phthalocyanine pigment which comprises dry-milling a crude copper phthalocyanine until it has an α-crystalline copper phthalocyanine content of more than 40% and then wet-milling it in the co-presence of an inorganic salt and an organic liquid.

PRIOR ART OF THE INVENTION

A finely milled copper phthalocyanine pigment gives an excellent color tone and has excellent properties such as high coloring power, high weatherability and high heat resistance. Therefore, it is widely used in a large quantity in the coloring material industry.

In general, a crude copper phthalocyanine is produced by reacting phthalic anhydride, urea and copper, or phthalodinitrile and copper in an organic liquid of alkylbenzene, trichlorobenzene or nitrobenzene in the presence or absence of a catalyst of ammonium molybdate or titanium tetrachloride under atmospheric pressure or elevated pressure. Since, however, synthesized phthalocyanine molecules continue crystal growth in the organic solvent, it is only possible to obtain acicular coarse particles having a length of 10 to 200 μm, and such particles of copper phthalocyanine are scarcely or never valuable as a coloring pigment for inks, coating compositions, plastics, and the like.

Therefore, it is required to finely mill such a crude copper phthalocyanine until it forms particles having high coloring value, i.e., particles having a diameter of 0.005 to 0.2 μm (this milling procedure will be referred to as "pigmentation" hereinafter).

A variety of processes for the pigmentation have been heretofore proposed. For example, U.S. Pat. Nos. 2,686,010 and 2,556,728 disclose a process for the production of finely milled β-form copper phthalocyanine, i.e., so-called dry salt milling process, which comprises dry-milling a crude copper phthalocyanine in the presence of a milling auxiliary such as anhydrous sodium ferrocyanide or sodium chloride and a small amount of an organic solvent at a high temperature of 100° to 150° C. for a long period of time. However, this process has the following defects and hence is industrially disadvantageous: The process requires milling for a long period of time, or has poor productivity. A crude copper phthalocyanine is liable to adhere to an apparatus wall and a milling medium, e.g., steel balls. And, it is therefore difficult to obtain an intended quality product giving high clearness and having high coloring power.

U.S. Pat. Nos. 4,141,904, 4,104,276 and 2,486,351 disclose a so-called dry-milling method in which a crude copper phthalocyanine is dry-milled in the absence of a milling auxiliary or an organic liquid. That is, with finely milling a crude copper phthalocyanine, it forms an intensely aggregated product due to transition of its crystal form from a β-form to an α-form, and in general, the resultant crude copper phthalocyanine in such a state is not usable as a pigment. In order to overcome this problem, these publications disclose a process for the production of a copper phthalocyanine having suitability as a pigment which comprises immersing of a copper phthalocyanine having an α-form and a β-form in a crystallizing solvent such as xylene, or the like to carry out transformation from the α-form to the β-form and obtain a dispersion. However, this process also has the following defects: The process is required to use a large amount of an organic liquid as a crystallizing solvent, and hence causes hygienic and environmental pollution problems. When the mixture is immersed in an organic liquid, it forms a large acicular crystal with crystal growth and its coloring power decreases. Further, U.S. Pat. No. 2,857,400 discloses a method in which a crude copper phthalocyanine is dry-milled and the resultant milled product is vigorously agitated in an organic solvent such as acetone thereby to obtain a copper phthalocyanine pigment. Even in this method, however, the pigment obtained has an aspect ratio of greater than 3. As a result, there is only obtained a β-form copper phthalocyanine which has a reddish hue and shows intense bronzing. The "bronzing" means a phenomenon in which a complementary color appears on a flat surface of a colored material depending upon an observation angle.

As an industrial process, Japanese Laid-Open Patent Publication No. 28119/1976 typically describes a so-called solvent salt milling process which comprises charging into a double arm kneader a crude copper phthalocyanine together with a milling auxiliary of an inorganic salt such as sodium chloride and an organic liquid such as an alcohol, polyol or amine, and wet-milling them. However, it is necessary to use a large amount of the milling auxiliary and a large amount of the organic liquid required to maintain the crude copper phthalocyanine and the milling auxiliary in good contact. Therefore, not only the production cost increases, but also much labor and time are required to treat waste water. Further, since it is required to carry out the milling for a long period of time, a very large amount of energy is required. In U.S. Pat. No. 2,486,351, an α-form copper phthalocyanine is milled in the presence of sodium bicarbonate and xylene, and the resultant pigment has a particle size of several micrometers. Thus, no fine particles effective as a pigment can be obtained. In order to overcome the above defects of the wet-milling process, Japanese Laid-Open Patent Publication No. 72758/1987 discloses a solvent salt milling process using a crude copper phthalocyanine prepared by dry-milling a crude copper phthalocyanine up to an α-crystal content of not more than 40% and its volume of not more than 60%. However, this process involves defects that the resultant copper phthalocyanine gives insufficient gloss and clearness and that its production efficiency is low since particles having an aspect ratio of greater than 3 are contained.

SUMMARY OF THE INVENTION

It is an object of this invention to provide a process for the production of a β-form copper phthalocyanine pigment of fine and graded particles capable of giving a colored article having excellent gloss and clearness.

It is another object of this invention to provide a process for the production of a β-form copper phthalocyanine pigment, which can achieve the shortening of time for pigmentation and a decrease in energy for use in pigmentation.

It is further another object of this invention to provide a process for the production of a β-form copper phthalocyanine, which permits a decrease in amounts of a milling auxiliary and an organic liquid for use in pigmentation.

According to this invention, there is provided a process for the production of a β-form copper phthalocyanine having a particle size of 0.005 to 0.2 μm and an aspect ratio of 1 to 3, which comprises the following steps:

a. dry-milling a crude copper phthalocyanine in a milling apparatus until the resultant dry-milled product has an α-crystal content of more than 45% by weight, wet-milling the resultant dry-milled product in the presence of a water-soluble inorganic salt and at least one organic liquid selected from the group consisting of water-soluble alkylene glycols having 2 to 3 carbon atoms and polyoxyalkylene glycols, wherein the inorganic salt is used in an amount that is 2 to 10 times, by weight, as large as that of the dry-milled copper phthalocyanine, and wherein the organic liquid is used in an amount that is 0.1 to 2 times, by weight, as large as that of the dry-milled copper phthalocyanine, and c. removing the inorganic salt and the organic liquid from the resultant wet-milled product.

DETAILED DESCRIPTION OF THE INVENTION

This invention relates to a process for the production of a β-form copper phthalocyanine pigment, which is carried out in the following manner: A crude copper phthalocyanine is first dry-milled usually in the absence of a milling auxiliary and an organic liquid with a milling apparatus having a milling medium such as a ball mill, a vibration mill, attriter, or the like until it has an α-crystal content of more than 45%, the α-crystal content being represented by $S_\alpha/(S_\alpha+S_\beta)\times 100$ in which $S_\alpha$ is a peak area at $2\theta=15.6°$, $16.6°$ for an α-form in an X-ray diffraction pattern and $S_\beta$ is a peak area at $2\theta=18.1°$, $18.4°$ for a β-form in the X-ray diffraction pattern. And, the resultant milled product is then wet-milled in the presence of a milling auxiliary of an inorganic salt and an organic liquid of at least one of monoalkylene glycols and polyalkylene glycols. The process of this invention is capable of decreasing a pigmentation time and is also capable of decreasing not only the amount of the milling auxiliary and the organic liquid but also decreasing milling energy. Further, there can be obtained a fine and graded β-form copper phthalocyanine pigment having a particle size of 0.005 to 0.2 1 m and an aspect ratio of 1 to 3, which is capable of imparting ink or coating composition-applied, colored articles and a colored plastic article with excellent gloss and clearness.

As described previously, a crude copper phthalocyanine is, in general, composed of coarse particles and strongly adsorbs air on its surfaces and within its pores. Therefore, it has poor wettability with an organic liquid when wet-milled, and it hence needs to be wetted by premixing it. The "premixing" means, e.g., a preliminary procedure of mixing a total amount of a crude copper phthalocyanine, half a required amount of a milling auxiliary and a total amount of an organic liquid in a wet-milling apparatus usually for several tens of minutes to several hours. This preliminary procedure requires a long time and a large amount of energy. However, when a crude copper phthalocyanine is dry-milled according to the process of this invention, the resultant crude copper phthalocyanine has sufficient wettability, and rarely requires premixing. Therefore, the pigmentation time can be decreased to a great extent, and the amount of an organic liquid can be decreased.

When a crude copper phthalocyanine finely divided according to the dry-milling step of this invention is used in a wet-milling step, the transformation from an α-form to a β-form and the crystal growth occur due to the presence of an organic liquid, and at the same time, acicular crystal growth is inhibited due to loading of a low milling energy. This mutual action between occurrence of the transformation and crystal growth and inhibition of acicular crystal growth has a grading effect to give a pigment having a uniform brick-like particle form and a uniform particle size. Therefore, the pigmentation mechanism in this wet-milling step entirely differs from that in a conventional wet-milling process which is required to use high milling energy to obtain fine pigment particles. For this reason, the pigmentation time can be shortened to a great extent, and the wet-milling energy can be also decreased to a great extent. That is, this invention requires only two thirds of the wet-milling time to obtain a pigment whose quality is equivalent to or higher than that of a pigment produced from a crude copper phthalocyanine. And, when the wet-milling time is the same, this invention requires only two thirds of the amount of the inorganic salt and organic liquid to obtain a pigment whose quality is equivalent to or higher than that of a pigment produced from a crude copper phthalocyanine. The "quality of a pigment produced from a crude copper phthalocyanine" means that of a pigment produced by only wet-milling a crude copper phthalocyanine without dry-milling it, i.e., quality of pigments prepared in Comparative Examples 1 and 2 in the present specification. Further, when pigmentation is carried out according to this invention by using a conventional amount of an inorganic salt and an organic liquid for a conventional period of time, there can be obtained a β-form copper phthalocyanine pigment capable of imparting a colored article with higher qualities such as excellent gloss and clearness.

When a crude copper phthalocyanine having an α-crystal content of not more than 45% after dry-milling is used in a wet-milling step, the crude copper phthalocyanine exhibits the same wettability as that of a crude copper phthalocyanine prepared in this invention. However, the pigmentation by wet-milling mainly involves finely milling as is the case when a copper phthalocyanine without dry-milling is used, and the grain growth and grading scarcely take place. Thus, this pigmentation mechanism differs from that of this invention.

An inorganic salt and an organic liquid are recovered and recycled due to waste water regulations. Since the amounts of the inorganic salt and the organic liquid are reduced in this invention, heat energy for the recovery can be reduced to a great extent.

The crude copper phthalocyanine used in this invention can be produced by a known method, and the production method is not specially limited. For example, a crude copper phthalocyanine is produced by reacting phthalic anhydride or its derivative, urea and a copper source, or phthalodinitrile and copper in an organic liquid such as alkylbenzene, trichlorobenzene or nitrobenzene in the presence or absence of a catalyst such as ammonium molybdate or titanium tetrachloride at 120° to 250° C., preferably at 170° to 230° C. for 2 to 15 hours, preferably 3 to 7 hours under atmospheric pressure or elevated pressure. As a crude copper phthalocyanine, a nonsubstituted copper phthalocyanine is preferred. However, a copper phthalocyanine substituted with not more than one chlorine atom or nitro group per molecule of the copper phthalocyanine may be used.

The dry-milling is carried out by using a milling apparatus having a milling medium such as a ball mill, a vibration mill, or an attriter usually in the absence of a milling auxiliary and in the absence of an organic liquid at a milling temperature of not more than 100° C. preferably not more than 80° C. The milled product has an α-crystal content of more than 45%, preferably 50 to 90%. The milling medium usually has ball or rod form, and is formed of steel or ceramic such as alumina, zirconia or glass. When the milling medium is particulate and spherical, preferred are those which have a diameter of 5 to 30 mm. The amount of the milling medium, if steel balls are used, is preferably 20 to 50 parts by weight per part of the pigment. When the α-crystal content is 45% or less, the grain growth and grading effect in the wet-milling are insufficient, and it is not possible to obtain a pigment capable of imparting a colored article with high gloss and high clearness. The time for the dry-milling is not specially limited if a crude copper phthalocyanine is dry-milled until the resultant copper phthalocyanine has an α-crystal content of more than 45%. With a practical mill, this value is achieved by dry-milling a crude copper phthalocyanine for 0.5 to 2 hours. In general, a crude copper phthalocyanine has a β-form. When a crude copper phthalocyanine which is converted from a β-form to an α-form by sulfuric acid treatment is dry-milled, the resultant dry-milled product has a 100% α-crystal content, and it is wet-milled to give a β-form pigment. In this case, however, the time required for the crystal transformation is a little longer.

The milling auxiliary is at least one member selected from water-soluble inorganic salts such as sodium chloride, sodium sulfate, calcium chloride and the like. A milling auxiliary preliminarily milled with a pulverizer is preferred. The amount of the milling auxiliary is 2 to 10 times, preferably 3 to 8 times by weight as large as that of the crude copper phthalocyanine.

The organic liquid is preferably that which at least has water solubility to some extent, and such an organic liquid is at least one member selected from alkylene glycols having 2 to 3 carbon atoms and polyoxyalkylene glycols. Specific examples of the organic liquid are ethylene glycol, diethylene glycol, triethylene glycol, tetraethylene glycol, propylene glycol, dipropylene glycol, tripropylene glycol, tetrapropylene glycol and polyethylene glycol. The amount of the organic liquid is 0.1 to 2, preferably 0.3 to 1.5 times, by weight, as large as that of the crude copper phthalocyanine.

The wet-milling apparatus used in this invention is that which is used for a conventional wet-milling process, such as a mixer and kneader.

The wet-milling time varies depending upon a wet-milling apparatus and amounts of a milling auxiliary and an organic liquid, and it is usually 1 to 15 hours, preferably 2 to 10 hours. The wet-milling time may be 2 to 4 hours depending upon the quality of an intended pigment. A pigment which can be practically used can be obtained when the wet-milling time is about 3 hours. When the milling time is shorter than 1 hour, a dry-milled product does not undergo complete transformation from α-crystal to β-crystal. Even when the wet-milling time is longer than 15 hours, the resultant pigment hardly show any further improved effect on the quality.

The wet-milling temperature varies depending upon an apparatus, amounts of a milling auxiliary and an organic liquid and the milling time, and it is usually 70° to 150° C., preferably 80° to 130° C. When the wet-milling temperature is lower than 70° C., the transformation time from an α-form to β-form takes long. When the wet-milling temperature is higher than 150° C., crystal growth proceeds rapidly and it is required to shorten the time for wet-milling. However, the grading time is also shortened accordingly, which is not preferred in view of quality. After the wet-milling is started, the temperature increases gradually up to an equilibrium between 90° C. and 120° C. Therefore, the wet-milling step needs to be carried out by heating or cooling as required.

The wet-milled copper phthalocyanine pigment is post-treated according to a conventional method. That is, a mixture after milled is treated with water or a diluted acid, filtered and washed with water to remove the milling auxiliary and the organic liquid and to isolate a pigment. The pigment is usable in this wet state or in a powder state after dried.

A resin, a surfactant, a copper phthalocyanine derivative and other additive may be incorporated into the wet-milled pigment as required.

The advantages of the process for the production of a β-form copper phthalocyanine, provided by this invention, are as follows.

(1) A fine and graded β-form phthalocyanine pigment having a particle size of 0.005 to 0.2 μm, preferably 0.01 to 0.1 μm, and an aspect ratio of 1 to 3 can be obtained.

(2) A pigment capable of imparting an ink or a coating composition-applied colored article or a colored plastic article with excellent gloss and clearness can be obtained.

(3) The pigmentation time can be shortened, and the pigmentation energy can be reduced to a great extent, which is advantageous in view of energy saving.

(4) The amounts of the milling auxiliary and the inorganic liquid can be reduced, which is advantageous in view of resource saving, and waste water treatment can be eased.

(5) The production output can be easily increased.

Thus, the process of this invention has high utility value as an industrial process for the production of a pigment.

In addition, a resin, a surfactant and other additive may be incorporated before, during or after the dry-milling step in this invention.

The β-form copper phthalocyanine obtained by this invention is widely useful as a coloring material for a printing ink, a plastic and a coating composition.

This invention will be explained further in detail hereinafter by reference to Examples, which, however, shall not limit this invention. In Examples, "part" stands for "part by weight".

Example 1

A crude copper phthalocyanine (purity 95%) was dry-milled with an attriter for 40 minutes to give a dry-milled product having an α-crystal content of 47%. Then, 100 parts of the dry-milled product, 500 parts of sodium chloride and 25 parts of diethylene glycol were charged into a double arm kneader having a volume of 1,000 parts, and kneaded (wet-milled) at 100° to 110° C. for 3 hours while additional diethylene glycol was added to maintain a dense mass (dough). The total amount of the diethylene glycol was 80 parts. After the wet-milling, the mixture was taken into 1,300 parts of a 1% sulfuric acid aqueous solution at 70° C., stirred for 1 hour while maintaining the temperature of 70° C., and filtered. The resultant solid was washed with water and dried to give 93 of a β-copper phthalocyanine pigment. The copper phthalocyanine pigment had a particle size of 0.02 to 0.06 μm and an aspect ratio of 1.2 to 2.5.

Examples 2, 3 and 4, and Comparative Examples 1, 2, 3 and 4

The same treatment as that described in Example 1 was repeated by changing the dry-milling and wet-milling conditions as shown in Table 1 to give β-copper phthalocyanine pigments.

Example 5

100 Part of crude copper phthalocyanine was treated in 500 parts of a 98% sulfuric acid aqueous solution at room temperature for 2 hours, and filtered. The resultant solid was washed with water and dried to give an α-form crude copper phthalocyanine. Thereafter, the α-form crude copper phthalocyanine was treated in the same way as in Example 1 to give a β-copper phthalocyanine pigment.

Examples 6 and 7

The same treatment as that described in Example 1 was repeated by changing the dry-milling time and the wet-milling conditions as shown in Table 1 to give β-copper phthalocyanine pigments.

Comparative Example 5

100 Parts of the same dry-milled product as that obtained in Example 1 was added to 460 parts of acetone to form a liquid slurry. While the liquid slurry was kept at 30° C., the liquid slurry was treated with a homogenizer at 5,000 rpm for 3 hours. The acetone was them removed by steam distillation to give an aqueous slurry of a pigment. The aqueous slurry was made strongly acidic with sulfuric acid, heated at about 80° C. for 30 minutes, and filtered and washed to remove soluble salts, and the remainder was dried and pulverized to give a β-copper phthalocyanine.

Evaluation method

A lithographic ink which was adjusted to a pigment content of 15% with a rosin-modified phenolic resin varnish was prepared by using a three-roll mill. Then, proof printing was carried out, and printed matter was measured for a density, clearness and gloss.

The density was measured by using a reflection-type densitometer (Pressmate densitometer 110 supplied by Color corporation). A larger value thereof means a higher density. For the clearness, L, a and b were color-measured with a color machine (Σ80 color measuring system supplied by Nippon Denshoku Ind. Co., Ltd.), and C value was calculated (C value=$\sqrt{a^2+b^2}$). A larger C value means a higher clearness. For the gloss, 60 degrees glossiness was measured with a glossmeter (UGV-5D supplied by Suga test instruments Co., Ltd.). A larger value means a higher gloss.

The particle size and the aspect ratio were determined with a transmission-type electron microscope (JEM 1200EX, supplied by Nippon Denshisha). The aspect ratio was determined on the basis of the length/width of particles; When a particle having an aspect ratio near to 1, the form of the particle is similar to a square form, and such a particle is well graded.

Table 2 shows the results of measurements using pigments obtained in Examples 1 to 7 and Comparative Examples 1 to 5.

TABLE 1

| Example & Comparative Example | DRY-MILLING Time (minute) | α-form content (%) | Dry-milled product (part) | WET-MILLING CONDITIONS Sodium chloride (part) | Diethylene glycol (part) | Time (hour) |
| --- | --- | --- | --- | --- | --- | --- |
| CEx. 1 | No | 0 | 100 | 500 | 90 | 5 |
| CEx. 2 | No | 0 | 100 | 500 | 100 | 10 |
| CEx. 3 | 15 | 24 | 100 | 500 | 85 | 3 |
| CEx. 4 | 15 | 24 | 100 | 500 | 95 | 10 |
| Ex. 1 | 40 | 47 | 100 | 500 | 80 | 3 |
| Ex. 2 | 60 | 63 | 100 | 500 | 80 | 3 |
| Ex. 3 | 90 | 76 | 100 | 500 | 80 | 3 |
| Ex. 4 | 120 | 88 | 100 | 500 | 80 | 8 |
| Ex. 5 | 60 | 100 | 100 | 500 | 80 | 3 |
| Ex. 6 | 60 | 63 | 100 | 500 | 85 | 10 |
| Ex. 7 | 60 | 63 | 100 | 300 | 40 | 3 |

Note:
CEx. = Comparative Example, Ex. = Example

TABLE 2

| Example & Comparative Example | Density | Clearness | Gloss | Particle size | Aspect ratio |
| --- | --- | --- | --- | --- | --- |
| CEx. 1 | 2.03 | 47.9 | 50.3 | 0.04–0.2 | 2.0–5.0 |
| CEx. 2 | 2.28 | 50.6 | 56.1 | 0.02–0.06 | 1.0–3.0 |
| CEx. 3 | 2.15 | 49.4 | 55.5 | 0.02–0.08 | 1.0–3.5 |
| CEx. 4 | 2.32 | 50.8 | 58.3 | 0.02–0.06 | 1.0–3.0 |
| CEx. 5 | 2.08 | 45.5 | 48.4 | 0.03–0.2 | 3.0–6.0 |
| Ex. 1 | 2.18 | 50.7 | 59.5 | 0.02–0.06 | 1.0–2.5 |
| Ex. 2 | 2.20 | 52.2 | 63.4 | 0.02–0.04 | 1.0–2.0 |
| Ex. 3 | 2.25 | 52.5 | 63.1 | 0.02–0.04 | 1.0–2.0 |
| Ex. 4 | 2.31 | 51.8 | 61.2 | 0.02–0.06 | 1.0–2.5 |
| Ex. 5 | 2.15 | 51.0 | 59.8 | 0.02–0.06 | 1.0–2.5 |
| Ex. 6 | 2.34 | 53.6 | 65.6 | 0.02–0.04 | 1.0–1.5 |
| Ex. 7 | 2.17 | 51.1 | 58.4 | 0.02–0.08 | 1.0–3.0 |

Note:
CEx. = Comparative Example, Ex. = Example

Tables 1 and 2 show the following:

When the wet-milling is carried out under the same conditions as is shown in Examples 1 to 5 and Comparative Examples 1 and 3, there is little difference in density. However, the gloss and clearness differ to a great extent. Further, the particle sizes in Examples 1 to 5 are finer than those in Comparative Examples 1 and 3, and the pigments in Comparative Examples 1 and 3 contain particles having an aspect ratio of more than 3, whereas the pigments in Examples 1 to 5 contain particles having an aspect ratio of 2.5 or less, or are sufficiently graded. Even when the wet-milling time according to a conventional process is extended as in Comparative Examples 2 and 4, the gloss, clearness and aspect ratio of the resultant pigments are lower than those of pigments of Examples 1 to 5 prepared by wet-milling for a shorter period of time. Further, when the wet-milling time is extended as is shown in Example 6, the resultant pigment has excellent particle size and aspect ratio, and can give excellent gloss and clearness. Furthermore, as is shown in Example 7, even if the amounts of a milling auxiliary and an organic liquid are respectively reduced to 60% and 50% of those in Example 1, it is possible to produce a pigment nearly equivalent to pigments produced by increasing the wet-milling time according to a conventional process shown in Comparative Examples 2 and 4.

What is claimed is:

1. A process for the production of a β-form copper phthalocyanine having a particle size of 0.005 to 0.2 μm and an aspect ratio of 1 to 3, which comprises the following steps:
    a. dry-milling a crude copper phthalocyanine in a milling apparatus until the resultant dry-milled produce has an α-crystal content of more than 45% by weight,
    b. wet-milling the resultant dry-milled product with a kneader in the presence of a water-soluble inorganic salt and at least one organic liquid selected from the group consisting of water-soluble alkylene glycols having 2 to 3 carbon atoms and polyoxyalkylene glycols, wherein the inorganic salt is used in an amount that is 2 to 10 times, by weight, as large as that of the dry-milled copper phthalocyanine, and wherein the organic liquid is used in an amount that is 0.1 to 2 times, by weight, as large as that of the dry-milled copper phthalocyanine at a temperature of 70° to 150° C., and
    c. removing the inorganic salt and the organic liquid from the resultant wet-milled product.

2. A process according to claim 1, wherein the crystal content is 50 to 90% by weight.

3. A process according to claim 1, wherein the crude copper phthalocyanine is dry-milled for 0.5 to 2 hours and the dry-milled product is wet-milled for 1 to 10 hours.

4. A process according to claim 1, wherein the dry-milled product is wet-milled for 2 to 4 hours.

5. A process according to claim 1, wherein the β-form copper phthaloycanine has a particle size of 0.01 to 0.1 μm.

* * * * *